United States Patent
Medina-Garcia

(10) Patent No.: US 10,797,582 B1
(45) Date of Patent: Oct. 6, 2020

(54) CROSS CONDUCTION PROTECTION IN A VOLTAGE CONVERTER

(71) Applicant: Infineon Technologies Austria AG, Villach (AT)

(72) Inventor: Alfredo Medina-Garcia, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/353,139

(22) Filed: Mar. 14, 2019

(51) Int. Cl.
 H02M 3/335 (2006.01)
 H02M 1/00 (2006.01)
 H02M 7/48 (2007.01)
 H02M 1/088 (2006.01)

(52) U.S. Cl.
 CPC ....... H02M 1/088 (2013.01); H02M 3/33576 (2013.01); H02M 2001/0009 (2013.01)

(58) Field of Classification Search
 CPC ..... H02M 2001/0058; H02M 3/33569; H02M 3/335; H02M 2007/4811; H02M 2007/4815
 See application file for complete search history.

(56) References Cited

U.S. PATENT DOCUMENTS

| 9,991,803 | B1* | 6/2018 | Wang | H02M 3/33507 |
| 2006/0098464 | A1* | 5/2006 | Osaka | H02M 3/3353 363/21.01 |
| 2013/0135903 | A1* | 5/2013 | Fu | H02M 3/3374 363/17 |
| 2014/0225439 | A1* | 8/2014 | Mao | H02M 3/3376 307/31 |
| 2015/0009717 | A1* | 1/2015 | Chen | H02M 3/33507 363/21.02 |
| 2018/0069480 | A1* | 3/2018 | Koo | H02M 3/33523 |
| 2018/0141457 | A1* | 5/2018 | Lee | H02M 3/33523 |
| 2018/0337606 | A1* | 11/2018 | Ausseresse | H02M 3/1588 |
| 2018/0367042 | A1* | 12/2018 | Andersen | H02M 3/3376 |

(Continued)

FOREIGN PATENT DOCUMENTS

JP 2005051918 * 2/2005

OTHER PUBLICATIONS

Englilsh translation of JP2005051918, Takahama Masanobu, Switching Power Supply, Feb. 2005 (Year: 2005).*

*Primary Examiner* — Thienvu V Tran
*Assistant Examiner* — Sisay G Tiku
(74) *Attorney, Agent, or Firm* — Armis IP Law, LLC

(57) ABSTRACT

An apparatus comprises: a voltage converter, a first switch, a second switch, and a controller. The voltage converter includes a combination of a primary winding and an auxiliary primary winding magnetically coupled to a secondary winding. The auxiliary primary winding is operable to generate a feedback voltage signal. The secondary winding is operable to receive energy from the primary winding to produce an output voltage to power a load. The controller controls switching operation of the first switch and the second switch to control a flow of current through the primary winding. The controller is further operable to: i) via a feedback voltage signal from the auxiliary primary winding, monitor a flow of current through a body diode of the second switch, and ii) control subsequent activation of the first switch to an ON state based on the monitored flow of current through the body diode of the second switch.

25 Claims, 13 Drawing Sheets

(56) References Cited

U.S. PATENT DOCUMENTS

| | | | |
|---|---|---|---|
| 2019/0036447 A1* | 1/2019 | Oh | H02M 1/08 |
| 2019/0222131 A1* | 7/2019 | King | H02M 1/088 |
| 2019/0260282 A1* | 8/2019 | Oh | H02M 1/08 |

* cited by examiner

CROSS CONDUCTION PROTECTION IN A VOLTAGE CONVERTER

BACKGROUND

As its name suggests, a conventional switched-capacitor converter converts a received input voltage into a output voltage.

In one conventional application, a flyback converter receives and converts an input voltage into a respective output voltage. Typically, such flyback converters include multiple switches that are operable to couple a respective primary winding of the flyback converter to multiple different reference voltages such as an input voltage and a corresponding ground voltage to produce the output voltage.

Switches in a power converter circuit are prone to damage when switches between different reference voltages depending on a respective configuration. To avoid so-called hard switching in the flyback converter, the switches in the flyback converter are preferably switched when there is near zero voltage across them and near zero current flowing through them.

Operation of a respective conventional flyback converter can result in so-called cross conduction. For example, a conventional flyback converter can include a high side switch and a low side switch coupled to a respective winding of a flyback transformer. Each of such switches can be coupled to a different reference voltage that is applied to the winding to vary an amount of current through the primary winding.

So-called cross conduction occurs in a respective power supply when i) the high side switch is simultaneously activated during a condition in which current flows through the low side switch, or more particularly, a body diode of the low-side switch, or ii) when the low side switch is simultaneously activated during a condition in which current flows through the high side switch, or more particularly, a body diode of the high-side switch.

BRIEF DESCRIPTION

This disclosure includes novel ways of providing improved performance of a voltage converter operable to generate a corresponding output voltage. For example, embodiments herein provide protection against cross conduction conditions.

More specifically, according to one embodiment, an apparatus (such as a power supply) comprises: a voltage converter, a first switch, a second switch, and a controller.

The voltage converter includes a combination of a primary winding and an auxiliary primary winding magnetically coupled with respect to each other and to a secondary winding. The auxiliary primary winding is operable to generate a feedback voltage signal. The secondary winding operable to receive energy from the primary winding to produce an output voltage to power a load. During operation, the controller controls switching operation of the first switch and the second switch to control a flow of current through the primary winding. In one embodiment, the controller is further operable to: i) via the feedback voltage signal, monitor a flow of current through a body diode of the second switch, and ii) control subsequent activation of the first switch to an ON state based on the monitored flow of current through the body diode of the second switch.

Note that the voltage converter as described herein is any suitable type of power supply or power converter. For example, in one embodiment, the voltage converter takes the form of an asymmetrical half bridge flyback voltage converter. Alternatively, the voltage converter takes the form of a symmetrical half bridge flyback voltage converter or other suitable type of power supply.

In accordance with further embodiments, the controller is further operable to: i) detect, via a polarity of the feedback voltage signal, the flow of current through the body diode during an OFF state of the second switch, and ii) based on the polarity of the feedback voltage signal, and detected current through the second switch, control activation of the first switch to an ON state while the second switch is in the OFF state.

In one embodiment, the feedback voltage signal indicates a direction of magnetizing current flowing through the primary winding.

In yet further embodiments, a magnitude of the monitored feedback voltage signal during the OFF state of the second switch (or during dead time when both switches are OFF) indicates whether current flows through the body diode of the second switch. In one embodiment, the controller is further operable to initiate activation of the first switch subsequent to a time of detecting that that there is no current flowing through the body diode of the second switch.

Further embodiments herein include a primary winding disposed in a resonant circuit path; activation of the first switch stores energy received from an input voltage in the resonant circuit path as well as conveys energy from the primary winding to the secondary winding.

In still further embodiments, the controller is operable to implement a time delay between a time of detecting a condition in which the monitored flow of current through the body diode is zero and activating the switch to the ON state.

In accordance with yet further embodiments, the controller is operable to produce, for a first control cycle, a time value measuring a time between a first event of controlling the second switch to an OFF state and a second event in which the monitored flow of current through the body diode is detected as being zero. Yet further, the controller can be configured to adjust, for a second control cycle, a subsequent activation of the second switch to an ON state again based on the previously measured time value in the first cycle.

Further embodiments herein include an apparatus comprising: a controller operable to: regulate conveyance of energy from a primary winding of a transformer to a secondary winding of the transformer to generate an output voltage that powers a load. In one embodiment, the controller achieves or contributes to regulation of the output voltage of the secondary winding via switching of a first switch and a second switch in a power supply. In addition to including a primary winding, the transformer (in a respective voltage converter) includes an auxiliary winding. The controller further receives a feedback voltage signal generated from an auxiliary winding of the transformer. Via the feedback voltage signal, the controller monitors a polarity of current through the second switch. The controller controls activation of the first switch to an ON state based on the monitored polarity of current through the second switch.

In accordance with yet further embodiments, the controller is further operable to: monitor the polarity of the current through the second switch (such as current through a body diode of the second switch) during a dead time in which both the first switch and the second switch are controlled to OFF states.

In still further embodiments, a magnitude and the polarity of the feedback voltage signal vary depending on an amount of current through a resonant circuit path of the voltage converter including the second switch and the primary winding of the transformer. In one embodiment, the auxiliary winding is absent from the resonant circuit path.

As previously discussed, the controller monitors attributes (such as magnitude and/or polarity) of the feedback voltage signal to determine when current flowing through the body diode of the second switch is zero. In response to detecting this condition, the controller initiates activation if the first switch again to input energy to a resonant circuit path of the voltage converter including the primary winding of the transformer. In one embodiment, the controller delays activation of the first switch with respect to a time of detecting a change in the monitored polarity of current through the second switch. Thus, in one embodiment, the change in polarity of the feedback voltage signal indicates that current through a body diode of the second switch (low side switch) is zero, and that it is safe to activate the first switch (high side switch) without occurrence of cross conduction. The delay in activating the first switch further ensures against cross conduction.

Accordingly, embodiments herein include different ways of providing body diode cross conduction protection in a flyback converter.

Embodiments herein are useful over conventional techniques. For example, in contrast to conventional techniques, the controller and corresponding control methods as described herein provide novel zero voltage switching and cross conduction protection over conventional techniques. Such embodiments provide improved reliability of components because they are no longer stressed (or overstressed) due to body diode cross conduction. Initially, embodiments herein provide improved efficiency (lower loss of energy) when generating a respective output voltage in comparison to conventional flyback converters.

These and other more specific embodiments are disclosed in more detail below.

In addition to potentially being implemented as an analog controller and corresponding analog circuitry/components as described herein, note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate generation of an output voltage to power a load and prevention of cross conduction in a power supply. The instructions, when executed by computer processor hardware, cause the computer processor hardware to: receive a feedback voltage signal from a voltage converter, the voltage converter controlled via switching operation of a first switch and a second switch to convey energy from a primary stage of the voltage converter to a secondary stage of the voltage converter that generates an output voltage; via the feedback voltage signal, detect a flow of current through a body diode of the second switch; and control subsequent activation of the first switch to an ON state based on the monitored flow of current through the body diode of the second switch.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling switches in a power supply operable to generate an output voltage, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
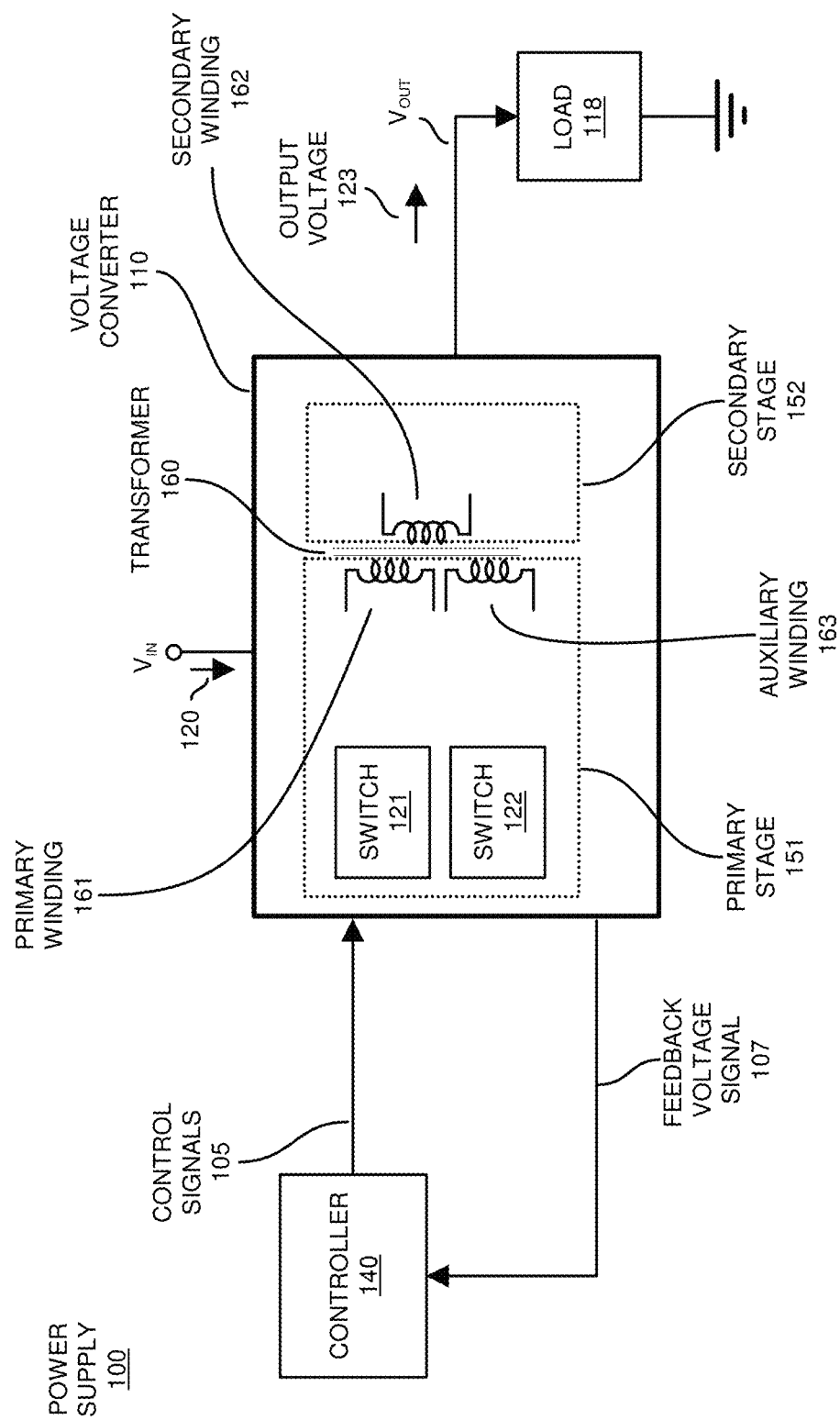
FIG. 1 is an example general diagram illustrating a power supply according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, as previously discussed, an apparatus (such as a power supply) comprises: a voltage converter, a first switch, a second switch, and a controller. The voltage converter includes a combination of a primary winding, an auxiliary primary winding, and a secondary winding magnetically coupled to each other. The auxiliary primary winding is operable to generate a feedback voltage signal based on an amount of current through the primary winding. (In one embodiment, the demagnetization current in primary winding reaching 0 in the transformer results in a voltage change in all windings.) The secondary winding is operable to receive energy from the primary winding to produce an output voltage to power a load. During operation, the controller controls switching operation of the first switch and the second switch to control a flow of current through the primary winding. The controller is further operable to: i) via the feedback voltage signal, such as received from the auxiliary winding, monitor one or more attributes (such as magnitude, polarity, etc.) of a flow of current through a body diode of the second switch, and ii) control subsequent activation of the first switch to an ON state based on the monitored flow of current through the body diode of the second switch.

In one embodiment, during so-called dead time when the first and second switches are both deactivated OFF), the controller monitors attributes (such as magnitude and/or polarity) of the feedback voltage signal to determine when current flowing through the body diode of the second switch is zero. In response to detecting this condition, the controller initiates activation of the first switch again to input energy to a resonant circuit path of the voltage converter including the primary winding of the transformer. In accordance with a further embodiment, the controller delays activation of the first switch with respect to a time of detecting zero current though (a body diode of) the second switch. Such a condition indicates that it is safe to activate the first switch (high side switch) without occurrence of so-called cross conduction.

Accordingly, embodiments herein include body diode cross conduction protection in a voltage converter in any number of different ways.

Now, more specifically, FIG. 1 is an example diagram illustrating a power supply according to embodiments herein.

As shown in this example embodiment, power supply 100 (such as an apparatus, electronic device, etc.) includes a controller 140 and voltage converter 110. Voltage converter 110 includes switch 121, switch 122, transformer 160, etc. Transformer 160 includes primary winding 161, secondary winding 162, and auxiliary winding 163.

Primary stage 151 of the voltage converter 110 includes switch 121, switch 122, as well as primary winding 161, and auxiliary winding 163. Secondary stage 152 includes secondary winding 162 and corresponding circuitry to generate the output voltage 123 that powers the load 118.

Note that each of the resources as described herein can be instantiated in a suitable manner. For example, each of the controller 140 and voltage converter 110, etc., in power supply 100 can be instantiated as or include hardware (such as circuitry), software (executed instructions), or a combination of hardware and software resources. In one embodiment, the transformer and capacitor C1 are connected between Vin and HB middle point and the roll of the switches 121 and 122 are inverted.

During operation, controller 110 produces one or more control signals 105 (such as one or more pulse width modulation signals) that control states of respective control switches 121 and 122 in the voltage converter 110.

Note that switches 121 and 122 can be any suitable type of components. For example, in one embodiment, each of the switches 121 and 122 can be a field effect transistor, bipolar junction transistor, etc.

As further shown, the voltage converter 110 receives the input voltage 120 (Vin, such as a DC input voltage). As previously discussed, transformer 160 includes a primary winding 161 and a secondary winding 162. The secondary winding 162 is inductively or magnetically coupled to the primary winding 161 to receive energy provided by the input voltage 120.

As further discussed herein, controller 140 of the power supply 100 controllably switches the switches 121 and 122 in a respective circuit path including the primary winding 161 of transformer 160 to convey energy to the secondary winding 152. The switching causes a change in a magnitude of current flowing through the primary winding. The secondary stage 152 of the voltage converter 110 converts the received energy from the primary winding 161 into the output voltage 123 that powers the load 118.

In accordance with further embodiments, voltage converter 110 generates voltage feedback signal 107. The feedback voltage signal 107 indicates a magnitude and direction of magnetizing current (Imag) flowing through the primary winding 161. In one embodiment, the auxiliary winding 163 generates the voltage feedback signal 107, although the voltage feedback signal 107 can be generated by any suitable resource (component) or combination of resources (components) in the voltage converter 110.

In one embodiment, a magnitude of the feedback voltage signal 107 indicates a polarity and/or tracks an amount of current through the primary winding and a respective body diode of switch 122.

As previously discussed, during switching operation, the secondary winding 162 is operable to receive energy from the primary winding 161 to produce the output voltage 123 to power the load 123. For example, the controller 140 controls switching operation of the first switch 121 and the second switch 122 to control a flow of current through the primary winding 161.

In one embodiment, to prevent so-called cross conduction (such as a condition in which current flows through the inherent diode D2 of the switch during activation of switch 121 to an ON state), the controller 140 is further operable to: i) via a state of the feedback voltage signal 107, monitor a flow of current through a body diode D2 of the second switch 122, and ii) control subsequent activation of the first switch 121 to an ON state based on the monitored flow of current through the body diode D2 (a.k.a., inherent diode) of the second switch 122.

Note that the voltage converter 110 as described herein is any suitable type of power supply or power converter. For example, in one embodiment, the voltage converter 110 takes the form of an asymmetrical half bridge flyback voltage converter. Alternatively, the voltage converter 110 takes the form of a symmetrical half bridge flyback voltage converter.

Figure 2:
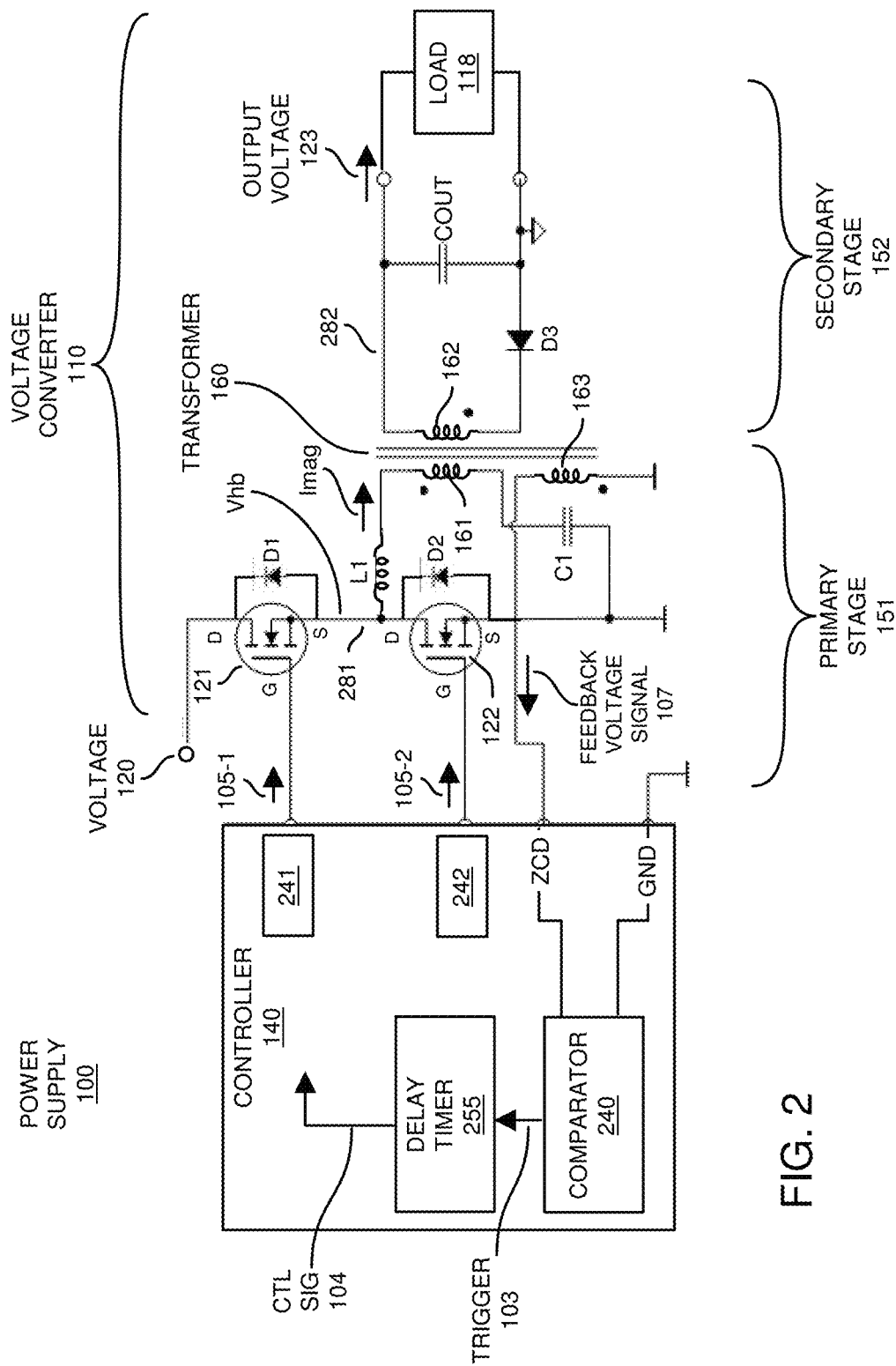
FIG. 2 is an example diagram illustrating a controller and a more detailed rendition of a power supply according to embodiments herein.

FIG. 2 is a diagram illustrating a controller and a more detailed rendition of an example power supply according to embodiments herein.

In this example embodiment, the switch 121 is instantiated as a field effect transistor including a body diode D1, a gate (G), drain (D), and source (S). Additionally, the switch 122 is instantiated as a field effect transistor including a body diode D2, a gate (G), drain (D), and source (S).

Driver 241 of the controller 140 is electrically connected to the gate of switch 121. The drain node of the switch 121 is connected to receive the input voltage 120. At node 281, the source node of the switch 121 is connected to the drain node of switch 122.

Driver 242 of the controller 140 is electrically connected to drive the gate of switch 122. The source node of switch 122 is connected to a first ground reference.

As further shown, the body diode D1 (inherent or parasitic diode) is disposed between the source node of switch 121 and the drain node of switch 121. The body diode D2 is connected between the source node of switch 122 and the drain node of switch 122.

In accordance with further embodiments, the voltage converter 110 includes a resonant circuit path disposed between the node 281 and the first ground reference. More specifically, the resonant circuit path includes a series connection of inductor L1 connected to the node 281, as well as primary winding 161 and capacitor C1 connected to the first ground reference.

A first end of the auxiliary winding 163 is electrically connected to the ZCD input of the controller 140 while the second end of the auxiliary winding 163 is connected to the first ground reference.

As further shown, the secondary winding 162 is connected between node 282 and the diode D3. The body diode D2 (inherent or parasitic diode) of switch 122 is disposed between the source node of switch 122 and the drain node of switch 122.

The combination of secondary winding 162 and diode D3 are connected in series between node 282 and the second ground reference. In one embodiment, note that devices such as switch with synchronous rectification can be used.

Capacitor Cout is connected between node 282 and the second ground reference.

In one embodiment, as shown, the primary winding 161 of the transformer 160 is disposed in a resonant circuit path such as the circuit path including a combination of the inductor L1, primary winding 161, and the capacitor C1. In one embodiment, such as further shown, the auxiliary winding 163 is absent from this resonant circuit path. In other words, the auxiliary winding 163 is magnetically coupled to primary winding 161 and secondary winding 162 but is not connected in series in the resonant circuit path.

Activation of the switch 121 to an ON state (while the switch 122 is set to an OFF state) stores energy received from the input voltage 120 in the resonant circuit path as well as conveys energy from the primary winding 161 to the secondary winding 162. Activation of the switch 122 to an ON state (while the switch 121 is set to an OFF state) dissipates energy stored in the resonant circuit path through the primary winding 161 to the secondary winding 162.

As previously discussed, the auxiliary winding 163 generates a feedback voltage signal 107.

As further shown, the controller 140 includes comparator 240. In one embodiment, during operation, comparator 240 compares the feedback voltage signal 107 to the first ground reference (e.g., any suitable threshold value such as around 0.0 volts, 40 millivolts, etc.).

Based on the comparison of the feedback voltage signal 107 to the reference voltage, the comparator 240 produces a respective trigger signal 103, a state of which depends upon whether the feedback voltage signal 107 is greater or less than the first ground reference voltage.

Delay timer 255 receives the trigger signal 103, which serves as a basis in which to activate the delay timer 255.

More specifically, as further discussed below, after expiry of a time delay as measured by timer 255, the controller 140 controls the driver 241 to activate the switch 121 subsequent to a time of deactivating the second switch 122. In such an instance, upon expiry of the time delay, the timer 255 outputs control signal 104, which provides a basis in which to control timing and generation of control signal 105-1 at an appropriate time with respect to control signal 105-2 such that there is no cross-conduction when switch 121 is activated. In other words, to prevent cross conduction, as further discussed herein, the controller 140 prevents activation of switch 121 until after a condition in which the body diode D2 no longer conducts and current no longer flows through the body diode D2.

Figure 3:
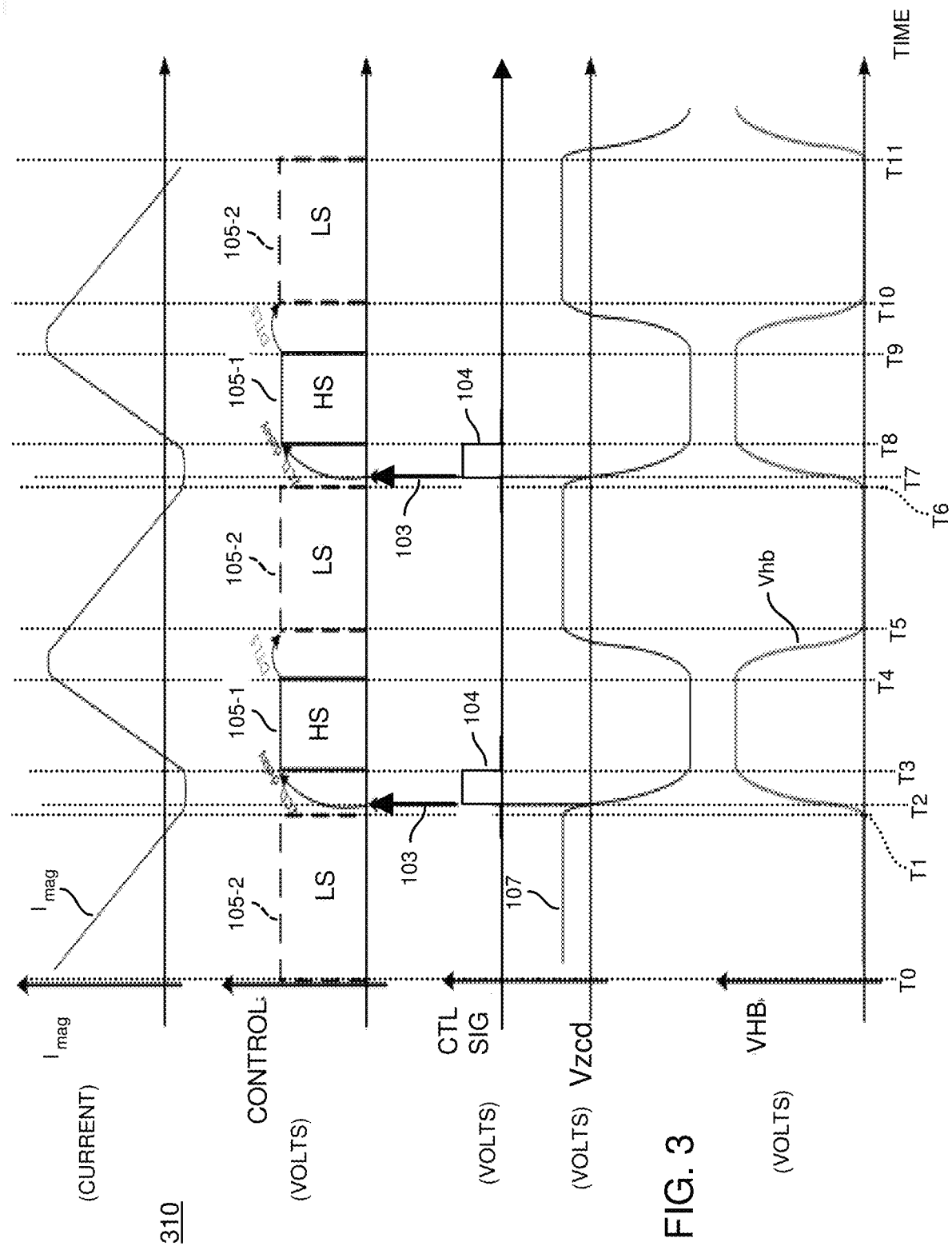
FIG. 3 is an example timing diagram illustrating control signals operable to control a power supply according to embodiments herein.

FIG. 3 is an example timing diagram illustrating control signals operable to control a power supply according to embodiments herein.

As previously discussed, the controller 140 monitors a magnitude of the feedback voltage signal 107 produced by the auxiliary winding 163. A magnitude of the monitored feedback voltage signal 107 during the OFF state of the switch 122 indicates whether current flows through the body diode D2 of the second switch 122. In one embodiment, the controller 140 is further operable to initiate activation of the first switch 121 for a predetermined amount of time subsequent to detecting that that there is no current (such as Imag, which is magnetizing current as previously discussed) flowing through the body diode D2 of the switch 122. The predetermined can be as little as no time or a predetermined amount of time greater than zero.

As further shown, graph 310 indicates magnitudes of signals as a result of activating the switch 121 and switch 122 at different times.

Figure 4:
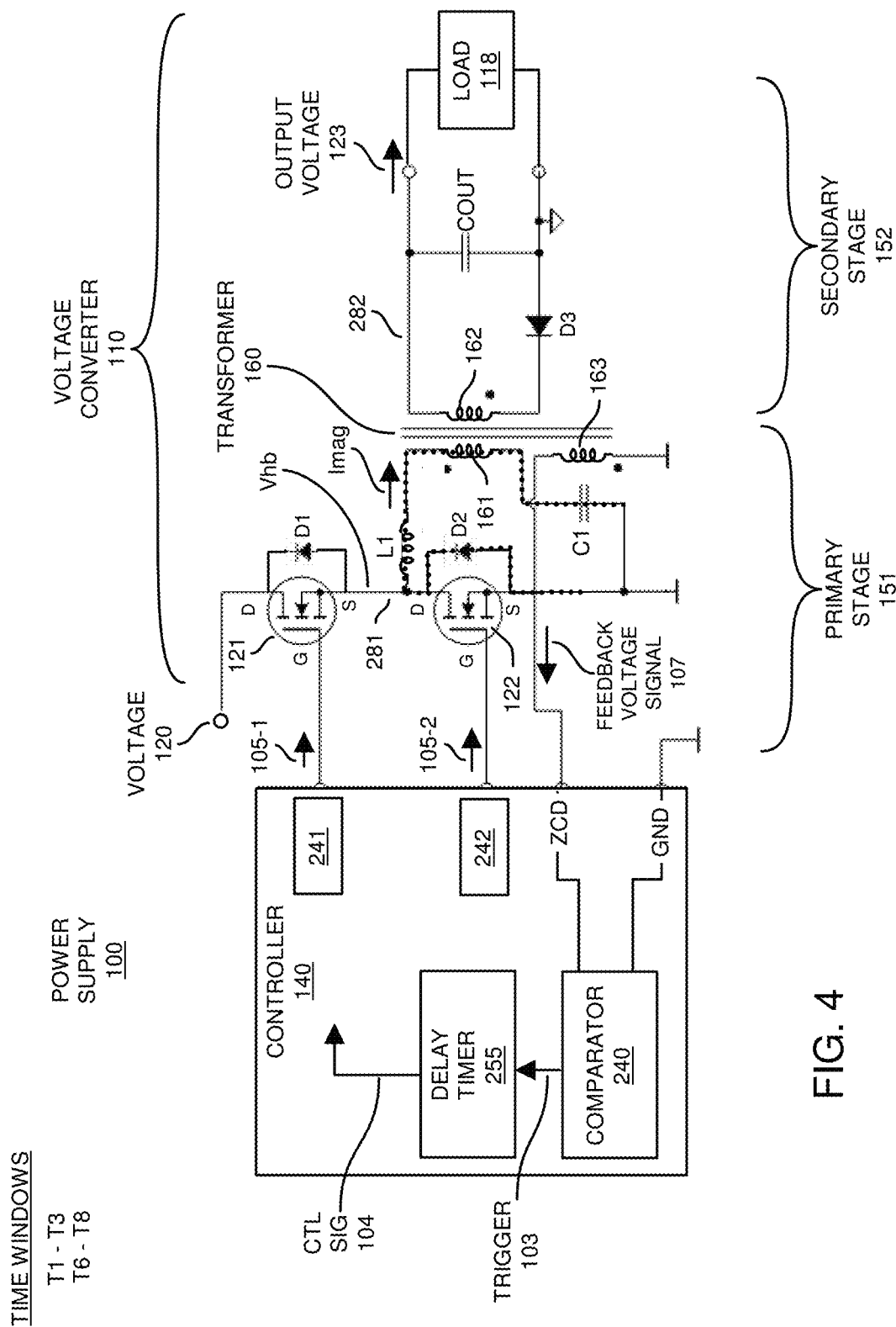
FIG. 4 is an example detailed diagram illustrating a power supply and a first mode of operation according to embodiments herein.

For example, between time T0 and time T1, the controller 140 controls a state of the driver 242 and corresponding control signal 105-2 to a logic high state while driver 241 drives control signal 105-1 to a logic low state. In such an instance, the current (Imag) passing through the primary winding 161 (Note again that magnetizing current represents the magnetizing energy of the transformer 160, and appears in the primary winding when switch 122 is switched OFF. decreases as shown in graph 310. Activation of the switch 122 between time T0 and T1 causes the resonant circuit path as shown in FIG. 4 to dissipate energy in the corresponding resonant circuit path to convey energy from primary winding 161 to the secondary winding 162, which is used to generate the output voltage 123 that powers the load 118.

At time T1, the controller 140 produces the control signal 105-2 to a logic low. The diode D2 conducts at least for a short amount of time. During the dead time, after time T1, the comparator 240 compares the magnitude of the feedback voltage signal 107 (ZCD) to the first ground reference.

In response to detecting at time or around time T2 that the magnitude of the feedback voltage signal 107 drops below 0.0 volts indicating that current discontinues flowing through the body diode D2 and corresponding primary winding 161, the comparator 240 generates the trigger signal 103 (such as an edge trigger). Note that after voltage signal 107 starts dropping or decreasing, it is safe to switch the switch 121 ON; thus, using 0V as a threshold value is an example use case, which can vary depending on the embodiment as previously discussed.

As previously discussed, this causes the delay timer 255 to be activated and measure a corresponding predetermined time delay (ZCD delay) with respect to time T2. After expiration of the predetermined time delay as measured by the delay timer 255 at time T3, the delay timer 255 changes a state of the control signal 104 (such as via falling edge) to indicate that it is time to activate the switch 121 again.

Thus, time window between time T1 and T3 represents a dead time in which the controller 140 sets switches 121 and 122 to OFF states (logic low). The controller 140 is further operable to indirectly monitor or determine (via voltage feedback signal 107) the polarity and/or magnitude of the current, Imag, through the second switch (such as current through a body diode D2 of the second switch 122) during the dead time in which both the first switch 121 and the second switch 122 are controlled to OFF states.

Figure 5:
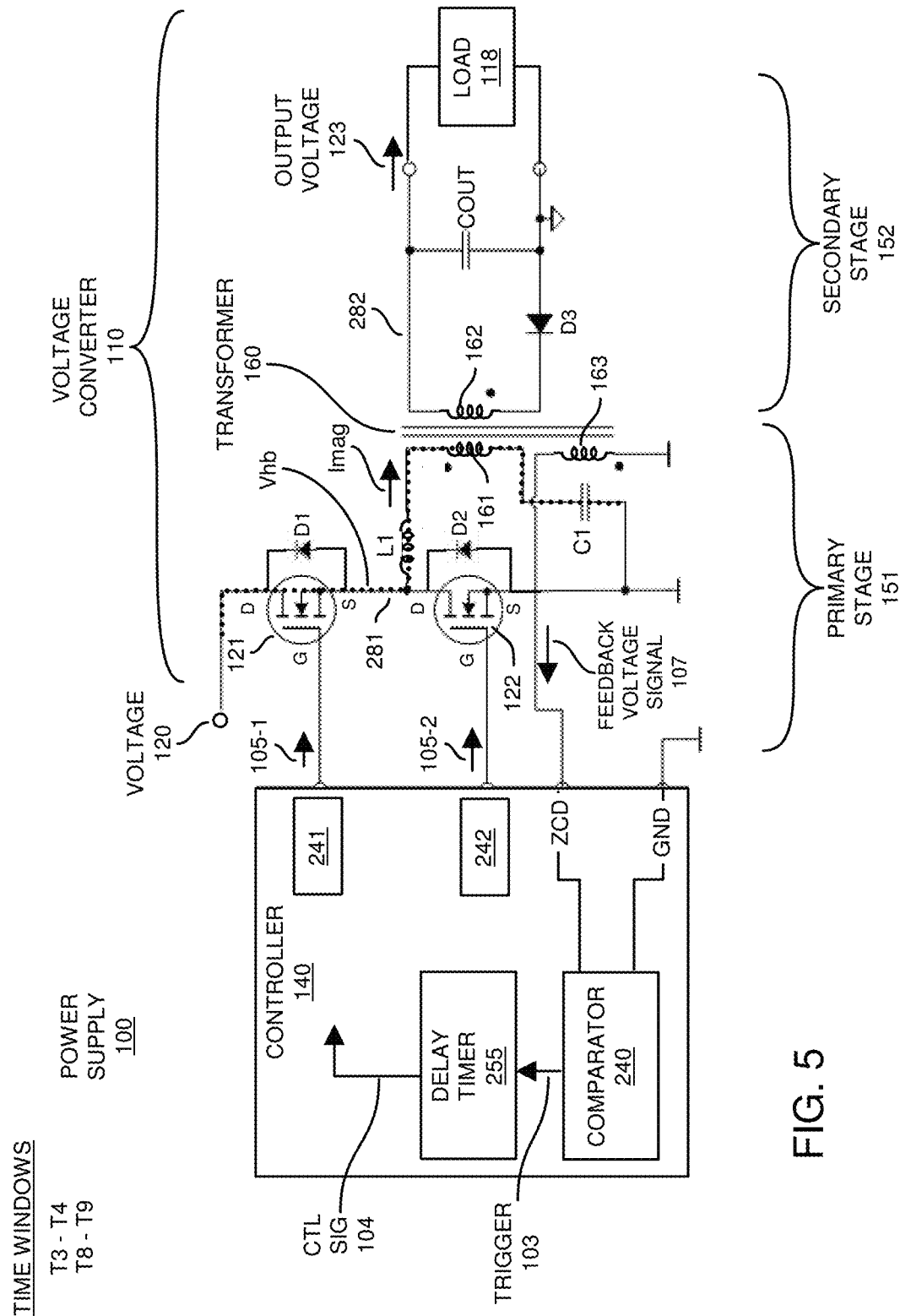
FIG. 5 is an example detailed diagram illustrating a power supply and a second mode of operation according to embodiments herein.

As mentioned, the falling edge of control signal 104 at time T3 causes the controller 140, via the driver 241, to activate the switch 122 to an ON state again. Activation of the switch 121 (while switch 122 is OFF) between time duration T3 to T4 causes an increase in current through (Imag) primary winding 161 again as shown in graph 310. Or, as previously discussed, activation of the switch 121 between time T3 and T4 causes the resonant circuit path as shown in FIG. 5 to store energy as well as convey energy from primary winding 161 to the secondary winding 162, which is used to generate the output voltage 123 that powers the load 118.

Accordingly, the controller 140 as described herein can be configured to implement a time delay between a time of detecting a condition in which the monitored flow of current through the body diode D2 is zero and activating the switch 121 to the ON state.

Note that the time window between time T4 and T5 represents a dead time in which the controller 140 sets switches 121 and 122 to OFF states (logic low).

After time T5, in a window between time T5 and T6, the control cycle then repeats in which the controller 140 initially activates the switch 122 to an ON state while switch 121 is turned OFF.

At time T6, the controller 140 produces the control signal 105-2 to be a logic low, turning OFF switch 122.

During the deadtime, the comparator 240 compares the magnitude of the feedback voltage signal 107 (ZCD) to the first ground reference. In response to detecting at time T7 that the magnitude of the feedback voltage signal 107 drops below or is equal to 0.0 volts (or other suitable value as previously discussed) indicating that current discontinues flowing through the body diode D2 and corresponding primary winding 161, the comparator 240 generates the trigger signal 103. This causes the delay timer 255 to be activated and measure a corresponding predetermined time delay (ZCD delay) with respect to time T7. After expiration of the predetermined time delay as measured by the delay timer 255 at time T8, the delay timer 255 generates the control signal 104.

The falling edge of control signal 104 at time T8 causes the controller 140, via the driver 241, to activate the switch 121 to an ON state again. Activation of the switch 121 (while switch 122 is OFF) between time T8 and T9 causes an increase in current through (Imag) primary winding 161 again. Or, as previously discussed, activation of the switch 121 causes the resonant circuit path as shown in FIG. 5 to store energy as well as convey energy from primary winding 161 to the secondary winding 162, which is used to generate the output voltage 123 that powers the load 118.

In one embodiment, the controller 140 is operable to monitor a polarity of the feedback voltage signal 107 such as when the feedback voltage signal 107 transitions from a positive to negative voltage. Accordingly, the controller 140 is further operable to: i) detect, via a polarity of the feedback voltage signal 107, the flow of current (Imag) through the body diode D2 during an OFF state of the second switch 122, and ii) based on the polarity of the feedback voltage signal 107, control activation of the first switch 121 to an ON state while the second switch 122 is in the OFF state.

Note again that embodiments herein are useful over conventional techniques. For example, in contrast to conventional techniques, the controller 140 and corresponding control methods as described herein provide novel zero voltage switching over conventional techniques. Such embodiments provide improved reliability of components because they are no longer stressed due to body diode cross conduction. Further, embodiments herein provide improved efficiency (lower loss of energy) and low electromagnetic interference (EMI) when generating a respective output voltage (especially under heavy load conditions) in comparison to conventional flyback converters.

Figure 6:
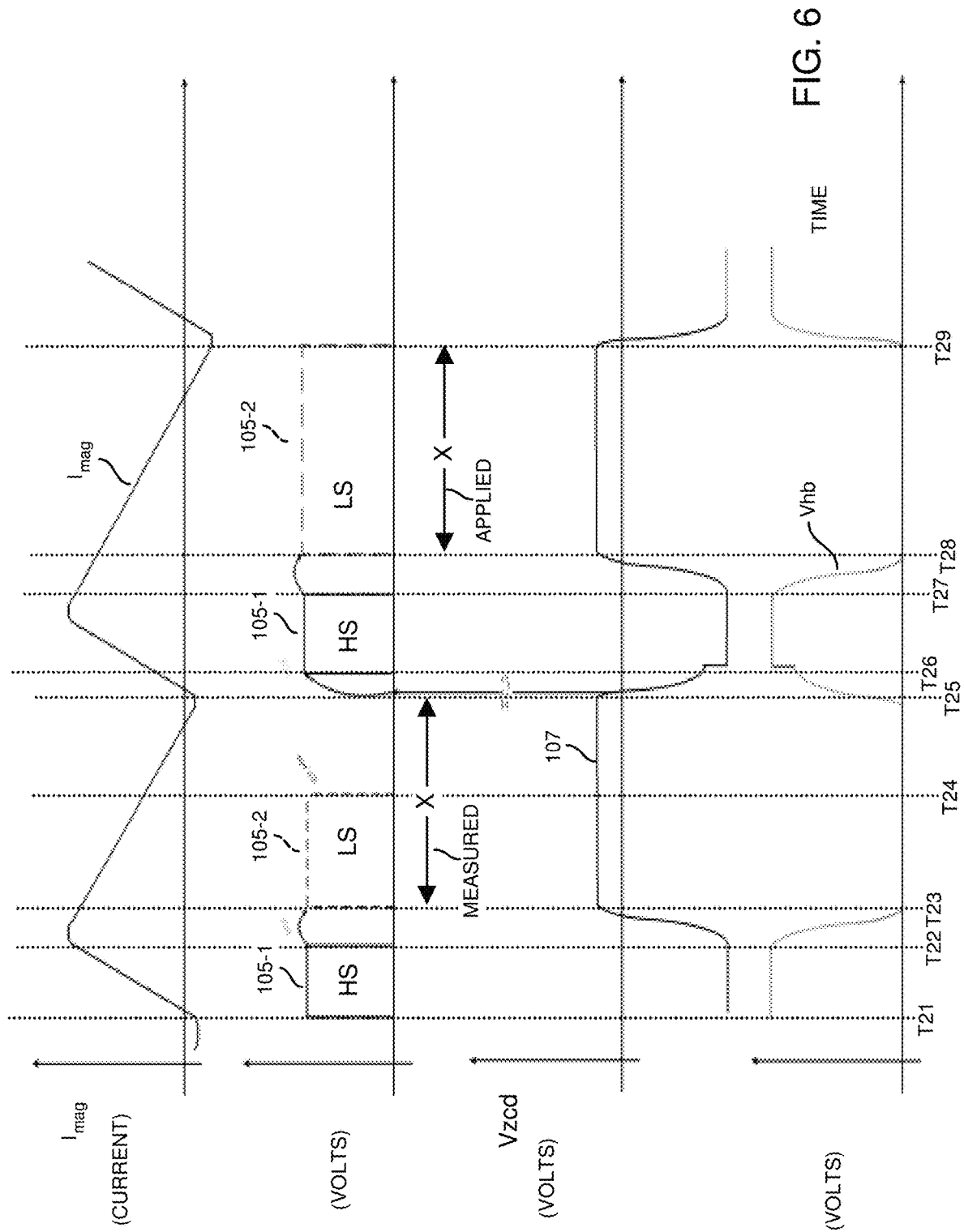
FIG. 6 is an example timing diagram illustrating control signals operable to control a power supply according to embodiments herein.

FIG. 6 is an example timing diagram illustrating control signals operable to control a power supply according to embodiments herein.

In this example embodiment, the controller 140 is operable to produce, for a first control cycle, or window such as between time T21 and T25, a time value X measuring a time between a first event (such as turning ON the switch 122 ON event at time T23) of controlling the second switch 122 to an OFF state and a second event (at time T25) in which the monitored flow of current (Imag) through the body diode D2 is detected as being zero amperes. As previously discussed, one way of determining the current through the body diode D2 is to monitor the voltage, Vzcd (feedback voltage signal 107), from the auxiliary winding 163.

Subsequent to determining the measured time value X, the controller 140 applies the measure time value X on a next one or more subsequent control cycle to prevent occurrence of a cross conduction condition in which wireless interface 121 is activated ON when the body diode D2 is still conducting from a prior cycle.

For example, according to one embodiment, via application of measured time X, the controller 140 adjusts, for a second control cycle (such as between time T25 and T29), a subsequent activation of the second switch 122 to an ON state again based on the measured time value X (between time T23 and time T25). In other words, at time of turning ON the switch 122 at time T28, the controller 140 maintains the switch 122 ON for the measure time X to ensure that the switch 121 is not activated when the body diode D2 is conducting (such as a condition in which current flows from ground reference through D2 to inductor L1, primary winding 161, etc.).

Thus, in one embodiment, via the feedback voltage signal 107, the controller 140 monitors a magnitude and/or polarity of current (Imag) through the second switch 122 to determine the time value X (or greater value) to be applied to one or more following control cycles. Application of the time value X includes body diode cross conduction protection in a flyback converter via adjustment of how long the switch 122 is activated to an ON state during one or more subsequent control cycles.

Note that the current value of X for each control cycle can be measured and applied to a next control cycle as needed to avoid cross-conduction.

Figure 7:
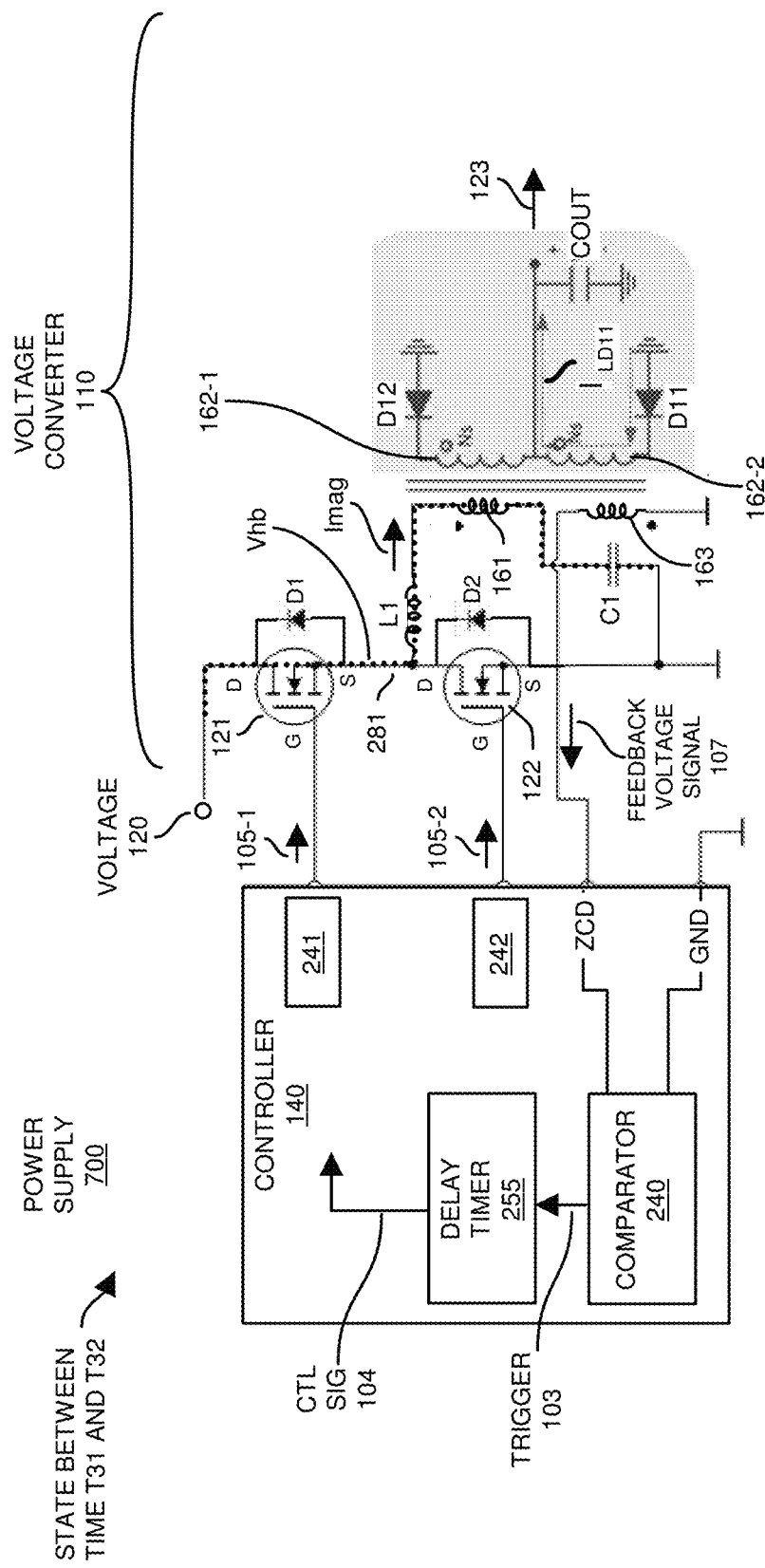
FIG. 7 is an example detailed diagram illustrating operation of a power supply in a first mode of operation according to embodiments herein.

FIG. 7 is an example detailed diagram illustrating operation of a power supply in a first mode of operation according to embodiments herein.

In this example embodiment, between time T31 and time T32 (see FIG. 9), the control signal 105-1 set to a high state and control signal 105-2 set to a logic low state, the controller 140 activates the switch 121 (to an ON state) and deactivates the switch 122 (to an OFF state).

In such an instance, current (Imag) flows from the voltage source 120 through switch 121 and corresponding resonant circuit path including inductor L1, primary winding 161, and capacitor C1.

On the output side, the flow of current (Imag) through the primary winding 161 causes the flow of current $I_{LD11}$ through the secondary winding 162-2 to produce the output voltage 123.

In a similar manner as previously discussed, the controller 140 monitors the feedback voltage signal 107 (from auxiliary winding 163) during the deadtime (such as prior to time T31 and after time T34) to activate switch 121 again when the current through the body diode D2 is substantially zero. In a similar manner as previously discussed, the activation time of the switch also can be adjusted according to the control implementation as discussed in FIG. 6.

Figure 8:
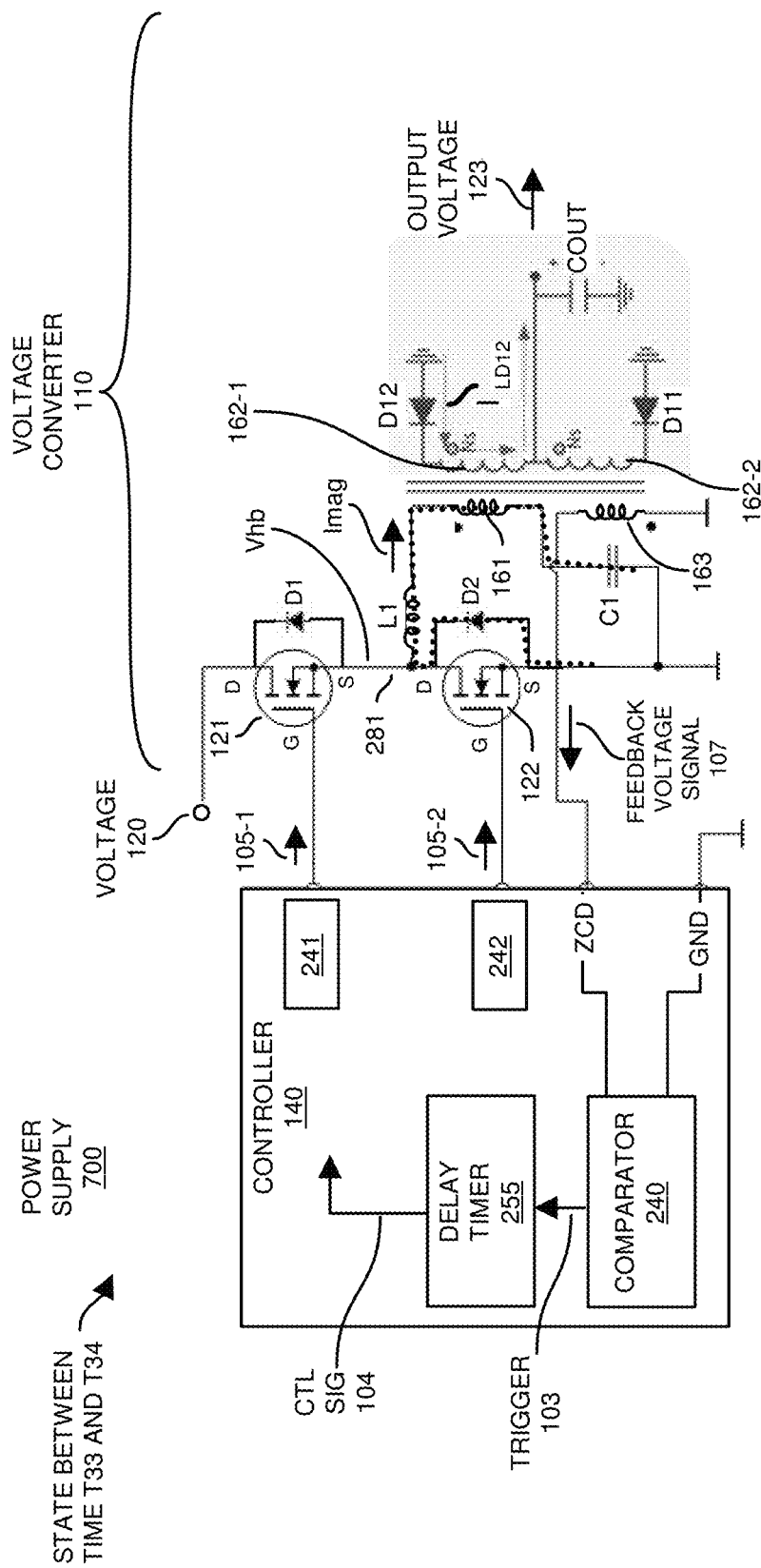
FIG. 8 is an example detailed diagram illustrating operation of a power supply in a sec mode of operation according to embodiments herein.

FIG. 8 is an example detailed diagram illustrating operation of a power supply in a first mode of operation according to embodiments herein.

Further in this example embodiment, between time T33 time T34, the controller 140 activates the switch 122 (to an ON state) and deactivates the switch 121 (to an OFF state). In such an instance, current (Imag) flows from the inductor L1 through a corresponding resonant circuit path including diode D2, inductor L1, primary winding 161, and capacitor C1.

On the output side, the flow of current (Imag) through the primary winding 161 causes the flow of current $I_{LD12}$ through the secondary winding 162-1 to produce the output voltage 123. Accordingly, any suitable type of output stage (secondary stage 152) can be used to generate a respective output voltage 123. Additional details timing of respective signals and providing full wave rectification are further shown in FIG. 9.

Figure 9:
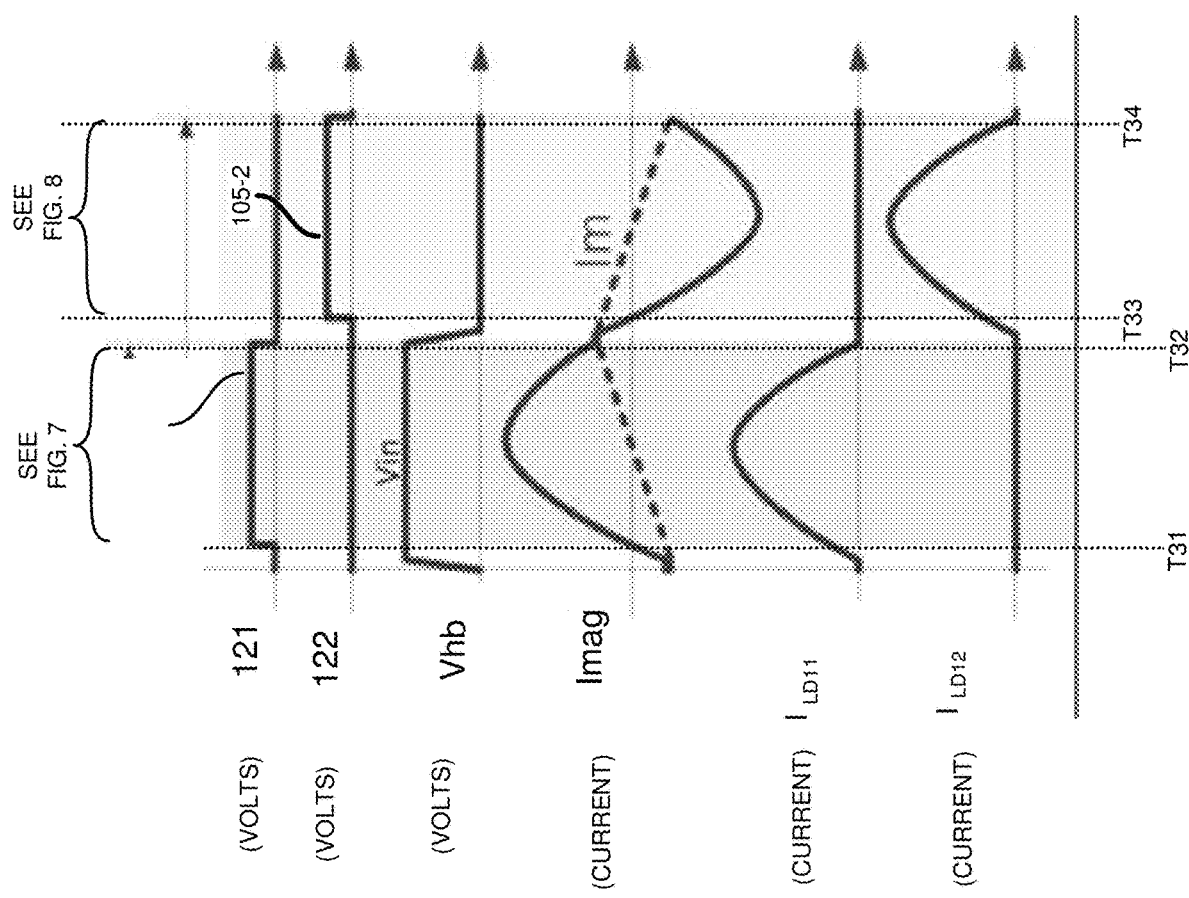
FIG. 9 is an example timing diagram illustrating control signals operable to control a power supply according to embodiments herein.

FIG. 9 is an example detailed diagram illustrating operation of a power supply in a first mode according to embodiments herein.

Graph 910 indicates the settings of control signals 105-1 and 105-2 for a given cycle of operating the power supply 700 in FIGS. 7 and 8. As previously discussed, between time T31 to T32, the controller 140 sets the control signal 105-1 to a logic high state, causing activation of the switch 121 to an ON state. Conversely, between time T31 and T32, the controller 140 sets the control signal 105-logic low state, causing deactivation of the switch 122 to an OFF state.

During this window of time, current Imag flows through the primary winding 161 as shown in graph 910.

As further shown, between time T31 and time T32, the current $I_{LD11}$ flows through the secondary winding 162-2 to produce the output voltage 123.

Between time T33 to T34, the controller 140 sets the control signal 105-2 to a logic high state, causing activation of the switch 122 to an ON state. Conversely, between time T33 and T34, the controller 140 sets the control signal 105-1 to a logic low state, causing deactivation of the switch 121 to an OFF state. During this window of time, current Imag flows in a reverse direction through the primary winding 161.

As further shown, between time T33 and time T34, the current $I_{LD12}$ flows through the secondary winding 162-1 to produce the output voltage 123.

Current $I_{LD11}$ and $I_{LD12}$ are stored in capacitor, Cout, and are used to produce the output voltage 123.

Figure 10:
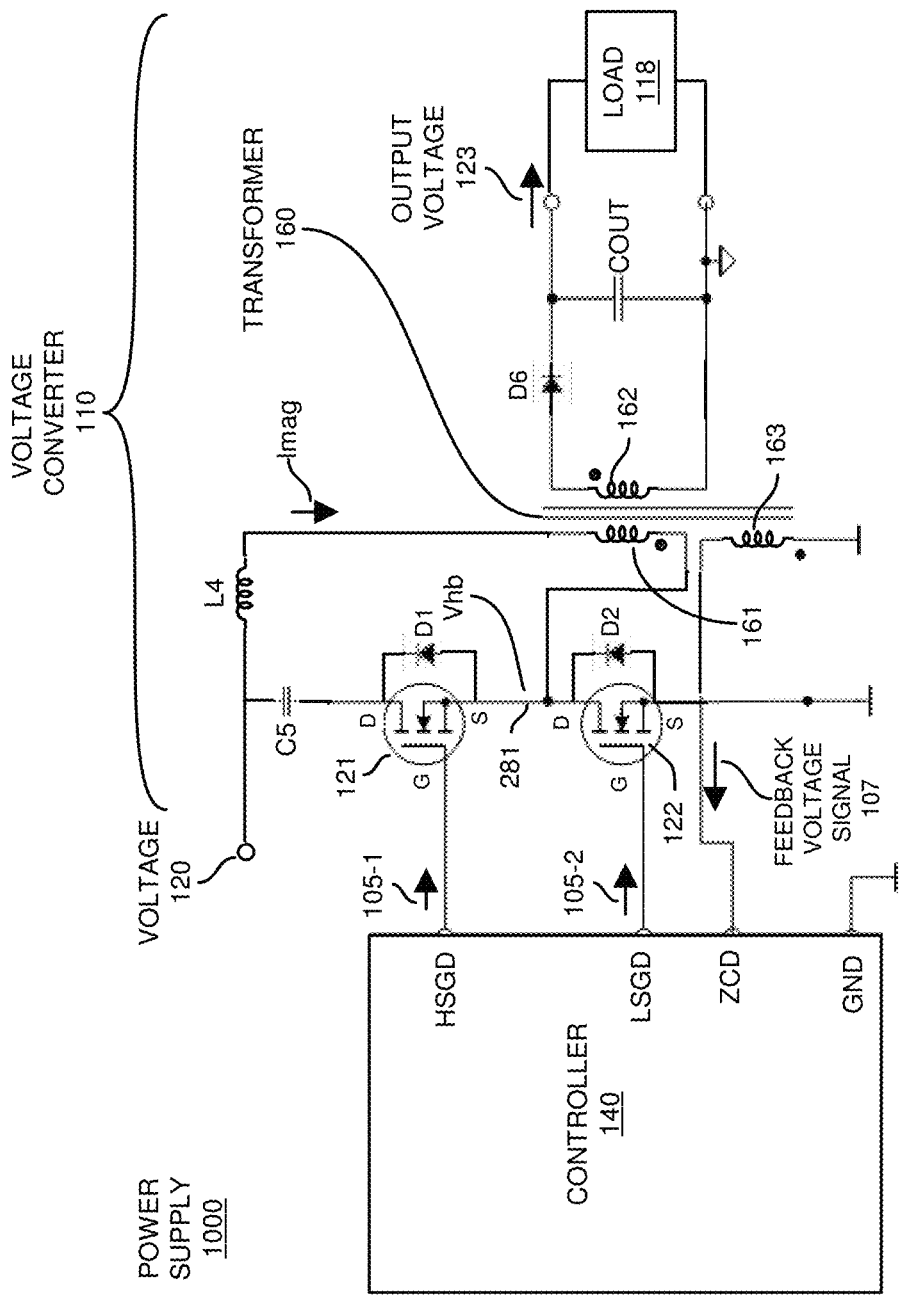
FIG. 10 is an example detailed diagram illustrating another configuration of a power supply according to embodiments herein.

FIG. 10 is an example detailed diagram illustrating operation of a power supply in a first mode according to embodiments herein.

As shown, the power supply 1000 is an alternative implementation of producing an output voltage 123 according to embodiments herein. However, in this example embodiment, the inductor L4 and capacitor C5 are connected directly to the input voltage 120. Further, the capacitor C5 is connected between the input voltage 120 and the drain of switch 121. The source node of switch 121 is connected directly to the drain node of switch 122. The source node of switch 122 is connected to the first ground reference voltage.

In a similar manner as previously discussed, the controller 140 and corresponding components receive feedback voltage signal 107 produced by the auxiliary winding 163. The controller 140 monitors the feedback voltage signal 107 during a dead time between shutting switch 122 OFF state and activating switch 121 to an ON state. Based on the feedback voltage signal 107, in a similar manner as previously discussed, the controller 140 prevents activation of the switch 121 until after the body diode D2 stops conducting (i.e., current ceases to flow from the ground reference through the diode D2).

As previously discussed, switching of the flow of current through the primary winding 161 conveys energy to the secondary winding 162, which is used to produce the output voltage 103 in power load 118.

Figure 11:
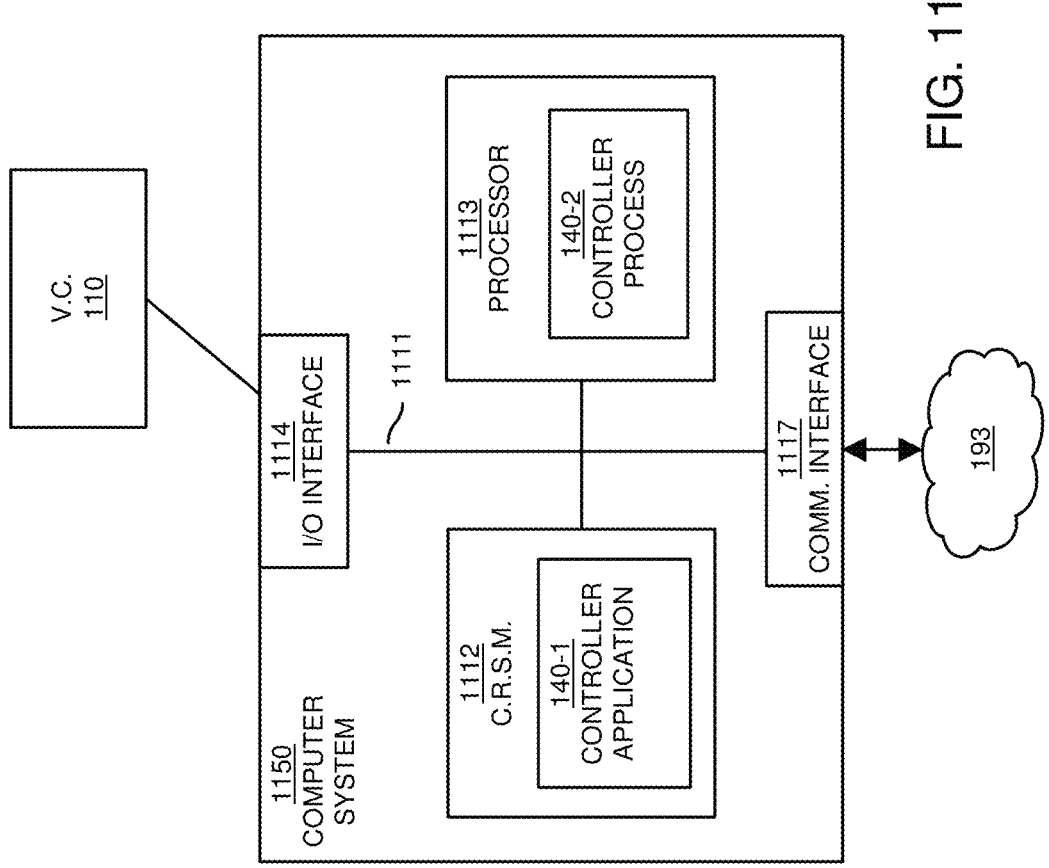
FIG. 11 is an example diagram illustrating computer architecture operable to execute one or more operations according to embodiments herein.

FIG. 11 is an example block diagram of a computer system for implementing any of the operations as previously discussed according to embodiments herein.

Any of the resources (such as controller 140, voltage converter 170, etc.) as discussed herein can be configured to include computer processor hardware and/or corresponding executable instructions to carry out the different operations as discussed herein.

As shown, computer system 1150 of the present example includes an interconnect 1111 that couples computer readable storage media 1112 such as a non-transitory type of media (which can be any suitable type of hardware storage medium in which digital information can be stored and retrieved), a processor 1113 (computer processor hardware), I/O interface 1114, and a communications interface 1117.

I/O interface(s) 1114 supports connectivity to voltage converter 110.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with controller application 140-1 (e.g., including instructions) to carry out any of the operations as discussed herein.

During operation of one embodiment, processor 1113 accesses computer readable storage media 1112 via the use of interconnect 1111 in order to launch, run, execute, interpret or otherwise perform the instructions in controller application 140-1 stored on computer readable storage medium 1112. Execution of the controller application 140-1 produces controller process 140-2 to carry out any of the operations and/or processes as discussed herein.

Those skilled in the art will understand that the computer system 1150 can include other processes and/or software and hardware components, such as an operating system that controls allocation and use of hardware resources to execute controller application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1150 may reside at any location or can be included in any suitable resource in any network environment to implement functionality as discussed herein.

Functionality supported by the different resources will now be discussed via flowcharts in FIGS. 12 and 13. Note that the steps in the flowcharts below can be executed in any suitable order.

Figure 12:
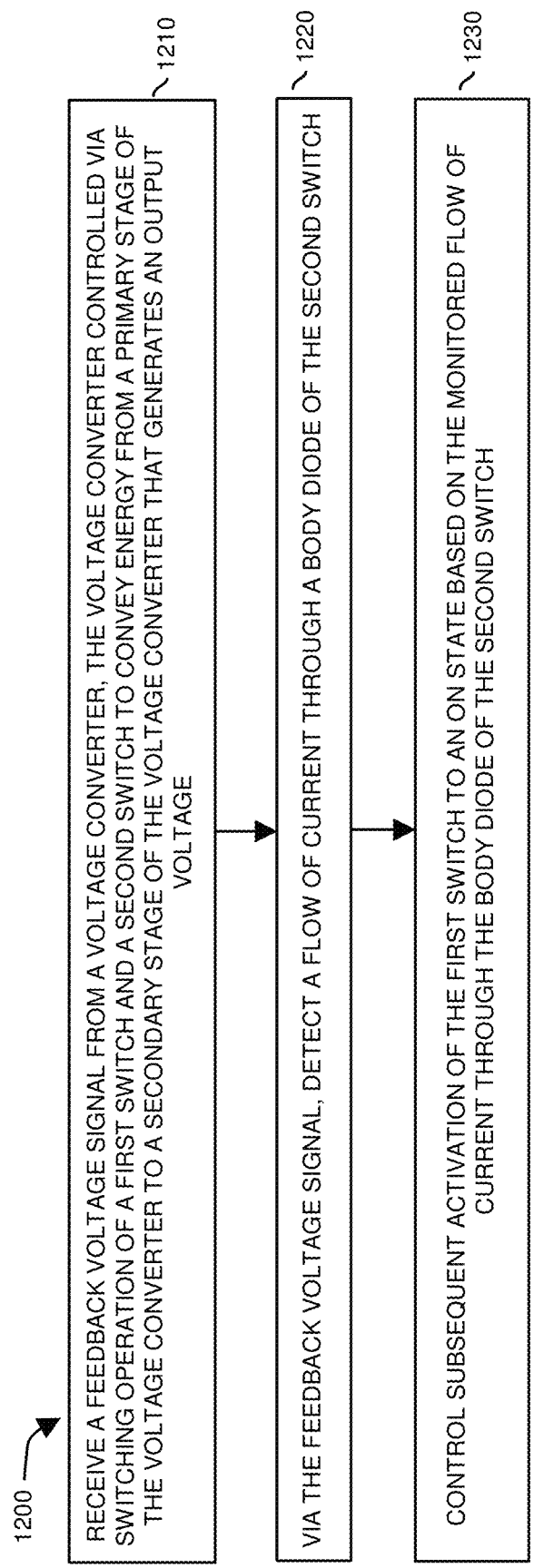
FIG. 12 is an example diagram illustrating a general method of preventing cross-conduction in a power supply according to embodiments herein.

FIG. 12 is a flowchart 1200 illustrating an example method according to embodiments herein. Note that there will be some overlap with respect to concepts as discussed above.

In processing operation 1210, the controller 140 receives a feedback voltage signal 107 from the voltage converter 110. The controller 140 controls switching operation of switch 121 and switch 122, which convey energy from a primary stage 151 of the voltage converter 110 to a secondary stage 152 of the voltage converter 110 that generates an output voltage 123.

In processing operation 1220, via the feedback voltage signal 107, the controller 140 detects or determines a flow of current, Imag, through a body diode D2 of the second switch 122.

In processing operation 1230, the controller 140 controls subsequent activation of the switch 121 to an ON state based on the determined flow of current Imag through the body diode D2 of the second switch 122.

Figure 13:
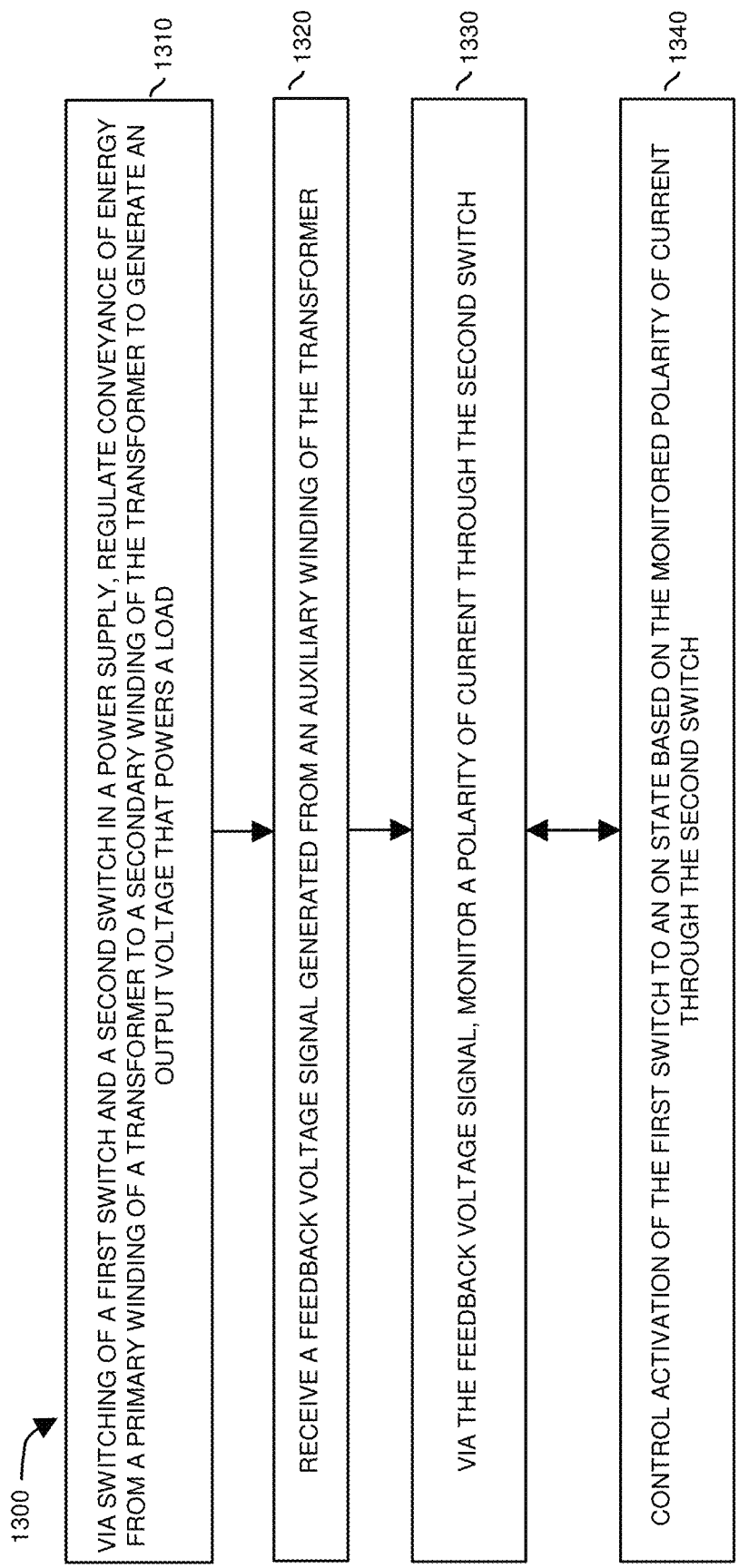
FIG. 13 is an example diagram illustrating a general method of preventing cross-conduction in a power supply according to embodiments herein.

FIG. 13 is a flowchart 1300 illustrating an example method according to embodiments herein. Note that there will be some overlap with respect to concepts as discussed above.

In processing operation 1310, via switching of a first switch 121 and a second switch 122 in a power supply 100, the controller 140 regulates conveyance of energy from a primary winding 161 of a transformer 160 to a secondary winding 162 of the transformer 160 to generate an output voltage 123 that powers a load 118.

In processing operation 1320, the controller 140 receives a feedback voltage signal 107 generated from an auxiliary winding 163 of the transformer 160.

In processing operation 1330, via the feedback voltage signal 107, the controller 140 monitors a polarity of current through the second switch 122.

In processing operation 1340, the controller 140 controls activation of the first switch 121 to an ON state based on the polarity of the current through the second switch 122 (as determined from the voltage feedback signal 107).

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a voltage converter including a primary winding coupled to a secondary winding, the secondary winding configured to receive energy from the primary winding to produce an output voltage to power a load;
a first switch and a second switch configured to control current through the primary winding;
a controller configured to: i) via a feedback voltage signal indicating current through the primary winding, determine a flow of current through a body diode of the second switch, and ii) control subsequent activation of the first switch to an ON state based on the determined flow of current through the body diode of the second switch; and
wherein the feedback voltage signal transitions from a positive voltage value to a negative voltage value during a dead time in which both the first switch and the second switch are in an OFF state.

2. The apparatus as in claim 1 further comprising:
an auxiliary winding magnetically coupled to the primary winding and the secondary winding, the auxiliary winding configured to generate the feedback voltage signal indicative of current through the primary winding.

3. The apparatus as in claim 2, wherein the first switch selectively couples a circuit path including the primary winding to an input voltage; and
wherein the second switch selectively couples the circuit path including the primary winding to a reference voltage.

4. The apparatus as in claim 2, wherein the controller is configured to control the subsequent activation of the first switch to the ON state based on a crossing of the feedback voltage signal with respect to a reference voltage.

5. The apparatus as in claim 1, wherein the controller is further configured to: i) detect, via the feedback voltage signal, a directional flow of current through the body diode during the OFF state of the second switch, and ii) based on the detected directional flow of current, control activation of the first switch to the ON state while the second switch is in the OFF state.

6. The apparatus as in claim 1, wherein the feedback voltage signal indicates a direction of magnetizing current flowing through the primary winding.

7. The apparatus as in claim 1, wherein a magnitude of the feedback voltage signal during the OFF state of the second switch indicates whether current flows through the body diode of the second switch.

8. The apparatus as in claim 1, wherein the controller is further configured to initiate activation of the first switch subsequent to detecting that there is no current flowing through the body diode of the second switch.

9. The apparatus as in claim 1, wherein the primary winding is disposed in a resonant circuit path; and
wherein activation of the first switch stores energy received from an input voltage, the input voltage inputted to the resonant circuit path.

10. The apparatus as in claim 1, wherein the controller is configured to implement a time delay between a time of detecting a condition in which the flow of current through the body diode is substantially zero and activating the first switch to the ON state.

11. The apparatus as in claim 1, wherein the controller is configured to produce, for a first control cycle, a time value measuring a time between a first event of controlling the second switch to the OFF state and a second event in which the flow of current through the body diode is detected as being zero.

12. The apparatus as in claim 11, wherein the controller is further configured to adjust, for a second control cycle following the first control cycle, a subsequent activation of the second switch to an ON state again based on the time value.

13. The apparatus as in claim 1, wherein the voltage converter is an asymmetrical half bridge flyback voltage converter.

14. A method comprising:
receiving a feedback voltage signal from a voltage converter, the voltage converter controlled via switching operation of a first switch and a second switch to convey energy from a primary stage of the voltage converter to a secondary stage of the voltage converter that generates an output voltage;
via the feedback voltage signal, determining a flow of current through a body diode of the second switch; and
controlling subsequent activation of the first switch to an ON state based at least in part on the determined flow of current through the body diode of the second switch as indicated by the feedback voltage signal; and
wherein the feedback voltage signal transitions from a positive voltage value to a negative voltage value during a dead time in which both the first switch and the second switch are in an OFF state.

15. The method as in claim 14 further comprising:
receiving the feedback voltage signal from an auxiliary winding of the primary stage of the voltage converter, the feedback voltage signal tracking magnetizing current flowing through a primary winding of the primary stage.

16. The method as in claim 14 further comprising:
monitoring the flow of current through the body diode during the dead time during which both the first switch and the second switch are controlled to the OFF state.

17. The method as in claim 14 further comprising:
detecting, via the feedback voltage signal, a magnitude and direction of the flow of current through the body diode during an OFF time of the second switch; and
based on the feedback voltage signal, and the magnitude and direction of the flow of current, controlling subsequent activation of the first switch to the ON state.

18. The method as in claim 14, wherein the feedback voltage signal indicates a direction of magnetizing current flowing through a primary winding of the primary stage.

19. An apparatus comprising:
a controller configured to:
via switching of a first switch and a second switch in a power supply, regulate conveyance of energy from a primary winding of a transformer to a secondary winding of the transformer to generate an output voltage that powers a load;
receive a feedback voltage signal generated from an auxiliary winding of the transformer;
via the feedback voltage signal, monitor a direction and magnitude of current through the second switch; and
control activation of the first switch to an ON state based on the monitored direction and magnitude of current through the second switch as indicated by the feedback voltage signal;
wherein the feedback voltage signal transitions from a positive voltage value to a negative voltage value during a dead time in which both the first switch and the second switch are in an OFF state.

20. The apparatus as in claim 19, wherein the controller is further configured to:
monitor the direction and magnitude of the current through the second switch during the dead time in which both the first switch and the second switch are controlled to OFF states.

21. The apparatus as in claim 19, wherein a magnitude of the feedback voltage signal varies depending on an amount of current through a resonant circuit path including the second switch and the primary winding of the transformer; and
wherein the auxiliary winding is absent from the resonant circuit path.

22. The apparatus as in claim 19, wherein the controller is further configured to:
delay activation of the first switch with respect to a time of detecting a change in the monitored direction and magnitude of the current through the second switch.

23. An apparatus comprising:
a voltage converter including a primary winding coupled to a secondary winding, the secondary winding configured to receive energy from the primary winding to produce an output voltage to power a load;
a first switch and a second switch configured to control current through the primary winding;
a controller configured to: i) via a feedback voltage signal indicating current through the primary winding, determine a flow of current through a body diode of the second switch, and ii) control subsequent activation of the first switch to an ON state based on the determined flow of current through the body diode of the second switch;
wherein the feedback voltage signal transitions from a first voltage value to a second voltage value during a dead time in which both the first switch and the second switch are in an OFF state;
wherein the first voltage value is greater than zero volts and the second voltage value is less than zero volts; and
wherein the controller is configured to activate the first switch to the ON state based on an instant in time of detecting that the magnitude of the feedback voltage signal crosses zero volts.

24. The apparatus as in claim 23, wherein the controller is configured to activate the first switch to the ON state after a predetermined amount of time passing with respect to the time of detecting that the magnitude of the feedback voltage signal crosses zero volts.

25. The apparatus as in claim 24 further comprising:
an auxiliary winding magnetically coupled to the primary winding and the secondary winding, the auxiliary winding configured to generate the feedback voltage signal indicative of current through the primary winding.

* * * * *